United States Patent [19]

Kersey et al.

[11] Patent Number: 5,312,598
[45] Date of Patent: May 17, 1994

[54] HOPPER SYSTEM AND ELECTROSTATIC GUN FOR INJECTION OF AN ELECTROSTATICALLY CHARGED SORBENT INTO A POLLUTED GAS STREAM

[75] Inventors: Larry M. Kersey, Scottsdale, Ariz.; Richard A. Steinke, Park City, Utah

[73] Assignee: Alanco Environmental Resource Corp., Salt Lake City, Utah

[21] Appl. No.: 111,941

[22] Filed: Aug. 26, 1993

[51] Int. Cl.$^5$ .................. B01D 50/00; B01J 8/08; B01J 19/08
[52] U.S. Cl. .................. 422/170; 422/177; 422/186.04; 422/186.1; 422/216; 55/317; 95/58; 95/107; 95/110
[58] Field of Search ............ 422/170, 177, 186.04, 422/186.1, 213, 216; 95/58, 107, 110; 96/27, 123, 150, 151; 55/317, 5, 6, 14, 73, 98, 99, 107, 126, 131, 138, 262, 390, 474, 479, 518, 522, DIG. 25

[56] References Cited

U.S. PATENT DOCUMENTS

| | | | |
|---|---|---|---|
| 4,624,765 | 11/1986 | Cerkanowicz et al. | 204/188 |
| 4,669,671 | 6/1987 | Hastings | 96/27 |
| 4,684,063 | 8/1987 | Goudy, Jr. | 96/27 |
| 4,979,968 | 12/1990 | Jido | 96/27 |

Primary Examiner—Robert J. Warden
Assistant Examiner—Christopher Y. Kim
Attorney, Agent, or Firm—M. Reid Russell

[57] ABSTRACT

A hopper system and electrostatic gun for injecting electrostatically charged sorbent particles into a polluted gas stream for inclusion in an apparatus that utilizes electrostatically charged sorbent particles for removing particulate matter and gases from a polluted gas stream. The invention includes a hopper system with a bin that is selected to hold a required volume of dry sorbent material and is arranged to feed a metered quantity of sorbent materials, preferably by a screw feed, to receive an air flow from a regenerative blower the air flow mixes with sorbent materials in a throat of a venturi line and transports that flow into a barrel an electrostatic gun. The air entrained sorbent materials travel around and along a charging wand that is centered longitudinally in the barrel bore, and is electrically connected to received a controlled voltage from a high voltage power supply. The charging wand provides an electrostatic charge to all the sorbent particles passing thereby that are then passed into and are rapidly dispersed in the polluted gas stream so as to provide a large charged area in the flow for electrostatically charging, by charged sorbent particle contact, the pollution particles and attracting submicron size of pollution particles. Agglomerized sorbent and pollution particles are thereby formed that are then removed, by passage through a series of filter beds of media materials that as selected for the particular agglomerized pollution and sorbent particles, cleaning the gas stream that is then vented to atmosphere.

11 Claims, 5 Drawing Sheets

HOPPER SYSTEM AND ELECTROSTATIC GUN FOR INJECTION OF AN ELECTROSTATICALLY CHARGED SORBENT INTO A POLLUTED GAS STREAM

BACKGROUND OF THE INVENTION

1. Field of the Invention

This invention relates to devices for providing an electrostatic charge to particles and in particular relates to a device for electrostatically charging a flow of a sorbent or particulate matter for injection into a polluted gas stream to create a highly charged field therein causing the pollution particulates to become charged by contact with and adhere to the charged and sorbent particles and agglomerize together for passage to a granular filter wherein the sorbent and pollution particles with adhering materials are captured by the granular material of the filter, cleaning the gas flow.

2. Prior Art

Devices for charging particles are, of course, not new, and electrostatic guns for introducing electrostatically charge sorbent particles into a gas stream so as to create a large charged surface area therein that induce charging of the particulate matter contained in a polluted gas flow have heretofore been available. Examples of such electrostatic gun and antenna devices are shown, for example, in U.S. Patents to Schuff; U.S. Pat. No. 4,220,478; and to Schuff, U.S. Pat. No. 4,290,786, and as set out in earlier U.S. Patent Applications of the inventors identified as "Apparatus For Removing Particulate Matter and Gasses From a Polluted Gas Stream" filed Jun. 14, 1993, and a method set out in a U.S. patent of the inventors entitled "Method for Removing Particulate Matter and Gasses From a Polluted Gas Stream" filed Jun. 18, 1 993.

Only in recent years have air pollution control apparatus and methods been developed, like those set out above, that provide for the efficient and effective removal of fine particulate matter, particularly submicron size particles of pollution. Even with such earlier particulate removal systems substantial difficulties have been experienced, due to a lack of system versatility as, for example, when such systems were required to meet strict pollution removal requirements as have been imposed by governmental agencies for the removal of such particulate matter. In particular, such systems have lacked versatility to alter sorbent injection flows and sorbent particulate charging for different gas stream pollution states, which versatility is now provided by the system of the invention.

Like the earlier Schuff patents, the present invention involves an improved charging gun for imparting an electrostatic charge into a flow of sorbent materials. Unique therefrom, however, the invention provides an electrostatic charging gun that receives a supply voltage that can be varied according to the volume and type of the sorbent particulates injection into the polluted gas stream, so as to provide a maximum surface charge onto each sorbent particle. The sorbent particles, that all bear the same charge, will repel one another and are accordingly rapidly dispersed through the gas stream. This creates a large charged surface area, that, in turn, induces a maximum charging of the particulate matter within that gas stream. This charging tends to agglomerate the submicron and larger particulates, with the gaseous pollutants chemically reacting with the charged sorbent particles and with the particles in a media materials bed.

The above set out capability to vary the charging of the electrostatic gun of the invention is provided to accommodate a capability for varying the flow rate of sorbent particles injected into the polluted gas stream. Which flow rate variability is to provide for a sufficient volume of charged sorbent particulates in the gas stream to completely react with the volume of pollutants, both particulate and gaseous, as are present in a particular polluted gas stream. The ability to select a particular volume of sorbent particles passed from a hopper system of the invention provides for a sorbent presence to effectively react with all the pollutants as are actually present in the gas stream. Such reaction provides for agglomerizing those particles and sorbent particles, with the selected sorbent particles also chemically reacting with the gaseous pollutant submicron size particles, the agglomerized and reacted particles then removed by passage through an arrangement of moving and static media material beds.

The gas flow containing agglomerated particulates and sorbent particles with captured pollutants is passed to a series of moving and static media bed arrangements that provide for the removal and collection of the sorbent reacted products, particulates and pollution gases from the gas stream, cleaning that gas stream that is then vented to atmosphere. The above cited Schuff apparatus and method patents are examples of the state of prior art, but presented limited capacity for particulate removal from high volume polluted gas flows. The present invention overcomes these deficiencies by including a capacity for controlling the volume of sorbent material flow and for adjusting electrostatic charging of that material. A closely controlled volume of highly charged sorbent particles is thereby provided for completely reacting with all the particulate and gaseous pollutants are present in a specific polluted gas stream.

SUMMARY OF THE INVENTION

It is a principal object of the present invention to provide a hopper system and electrostatic gun for inclusion with apparatus for the removal of pollutants from a gas stream, the electrostatic gun for electrostatically charging and injecting a selected volume of sorbent particles, as it has received from a hopper system into a polluted gas stream, where the volume of sorbent materials and the charge applied to the individual sorbent particulates can be varied according to the types of pollutants and their volume found within the gas stream.

Another object of the present invention is to provide an electrostatic gun for electrostatically charging a flow of sorbent material particles, under pressure, where the charging voltage can be varied for fully charging the sorbent flow particles, providing a maximum change on all of the particles as are injected into a polluted gas stream.

Another object of the present invention is to provide an electrostatic gun that has a barrel whose size is selected for accommodating a particular flow of sorbent materials such that all the sorbent particles in the flow of sorbent materials will receive a maximum charge.

Another object of the present invention is to provide a hopper system for an electrostatic gun that includes a capability for adjusting the flow rate or volume of sorbent materials to accommodate the electrostatic charge applied thereto to provide a volume of fully charged sorbent particles for injection into a polluted gas stream that has particular make-up and volume of pollution constituents.

Still another object of the present invention is to provide a hopper system and electrostatic gun for inclusion with apparatus for removing essentially all pollutants from a variety of gas streams that is safe and reliable to use and is relatively inexpensive to maintain.

These and other objectives of the present invention will become apparent to those knowledgeable and skilled in the art with the description set out below.

Briefly, the hopper system and electrostatic gun of the present invention provide a arrangement for electrostatically charging and injecting a controlled volume of sorbent material into a polluted gas stream. The electrostatic gun may itself be sized to handle a particular volume of sorbent material that is itself variable at the hopper system, and more than one hopper system and electrostatic gun may be arranged to feed a required volume of charged sorbent particles into a polluted gas stream to fully charge the pollutant particulates in that gas stream for collecting essentially all the pollution particulate matter, including submicron size particles from the gas stream. The charged sorbent particles injected into the polluted gas stream are to fully charge all of which pollution particles and to collect, on their surfaces, essentially all the submicron size pollution particles present in that stream. The gas stream with entrained agglomerized charged sorbent and pollution particles is then passed to a filter apparatus for removal of all the agglomerized pollution and sorbent particles that are then passed for recovery, recycling, or disposal, with the now clean gas stream vented to atmosphere.

The hopper system of the invention provides for metering dry powdered sorbent materials into an air system from a regenerative blower utilizing a mechanical screw feed that is designed for providing a metered dry materials flow. The system can be either a volumetric feed system or a loss-in-weight, system, each to provide an accurate feed of dry sorbent materials as required for a particular pollution particulate content. The sorbent particle flow is mixed with a controlled volume of air from the regenerative blower in an ejector venturi, with the mix of air and dry sorbent materials then passed into a barrel of the electrostatic gun.

A diameter of the barrel of the electrostatic gun is selected for the particular volume of sorbent and air mix flow it is to receive and includes a charging wand installed longitudinally in that barrel that is connected to a variable source of electrical energy to provide a high voltage corona discharge around the wand that the flow of sorbent particles passes through. Which passage provides all the individual sorbent particles with a strong electrostatic charge, that can be either positive or negative. The charged sorbent particles are then injected and dispersed into the polluted gas stream. The sorbent particles, as they have like charges, tend to repel one another to provide a large charged area in the gas stream wherein the pollution particulates are themselves charged by contact with the charged sorbent particles and are agglomerize therewith. The charged sorbent particles also attract and react with submicron size pollution particles of the gaseous pollutants, also forming agglomerized particles The electrostatic gun of the invention is arranged to provide a corona discharge around the charging wand that can be varied to accommodate different flows of sorbent materials as have been selected for reacting with the constituents of a particular gas stream. Also, multiple electrostatic guns, each for receiving a like or different sorbent flow, as determined, can be provided a greater volume of sorbent particles as required to charge a large volume of pollution particles as are present in a pollution gas stream, reacting with all the pollutants in that gas stream.

The charged sorbent particles, that are preferably fine grain particles, after passage through the electrostatic gun or guns all bear the same charge and thereby repel one another and are rapidly dispersed in the gas stream. The gas stream particulate matter, that consists of larger pollution particles that tend to agglomerize together, and the sorbent particles that tend to react with and attract submicron size particles, all carry the same charge and are passed together for removal from the gas stream into a transition section of a pollution removal apparatus. Which apparatus provides a series of moving and stationary granular media material filter beds that are serially arranged in a collection section housing for removing the agglomerized pollution and sorbent particles, thereby cleaning the gas stream that can then be vented to atmosphere. Whereafter, collected materials can themselves be cleaned by screening for disposal or, as required, can be recycled for reuse as media material for a moving bed filter.

BRIEF DESCRIPTION OF THE DRAWINGS

In the drawings that illustrate that which is presently regarded as a best mode for carrying out the invention.

DETAILED DESCRIPTION

Figure 1:
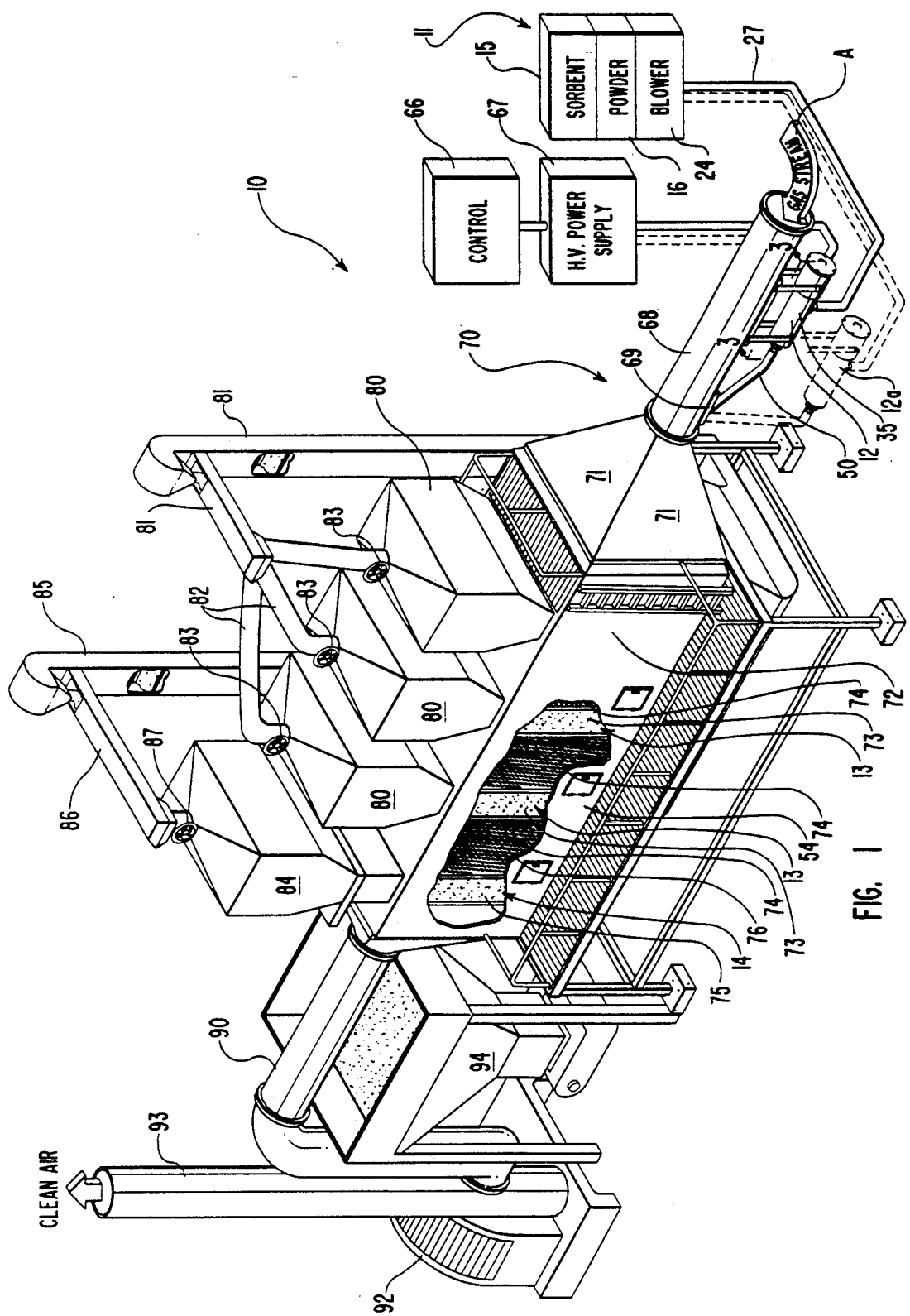
FIG. 1 is a profile perspective view of an apparatus for removing particulate matter and gaseous pollutants from a polluted gas stream that includes the hopper system and electrostatic charging gun of the invention, and showing the hopper system for feeding dry sorbent materials to a first electrostatic charging gun, a power supply and controls for which first electrostatic charging gun and showing, in broken lines, an optional second electrostatic charging gun for injecting a flow of charged dry sorbent particles into the polluted gas stream, charging and reacting with the pollution particulates in that gas stream that is then directed through multiple moving beds and a static bed of a filter media material to remove agglomerized particles of pollution and sorbent particulates for processing, and provides for venting the cleaned stream to atmosphere.

FIG. 1 shows a profile perspective view of an apparatus for removing particulate matter and gaseous pollutants from a polluted gas stream 10, hereinafter referred to as apparatus 10, that includes a hopper system 11 and an electrostatic charging gun 12 of the invention hereinafter referred to as electrostatic gun. The hopper system 11 is for supplying a measured flow of a dry sorbent material and mixing that flow with air, under pressure, for passage into the electrostatic gun 12 that, in turn, provides for uniformly charging individual sorbent material particles for dispersion into a polluted gas stream, illustrated by arrow A.

The apparatus 10 is a system for the removal of particulate matter from a polluted gas stream and is suitable for inclusion with pollution control apparatus like that set out in U.S. patent applications of the inventors entitled "Apparatus For Removing Particulate Matter and Gasses From a Polluted Gas Stream" filed Jun. 14, 1993, a "Method for Removing Particulate Matter and Gasses From a Polluted Gas Stream" filed Jun. 18, 1993. Though, it should be understood, the invention could be used with other pollution control apparatus that also utilize electrostatically charged sorbent materials for agglomerizing with pollution particulates for removal, within the scope of this disclosure.

As set out above, the present invention provides a combination of the hopper system 11 and electrostatic gun 12 for inclusion as components of apparatus 10 for injecting a pressurized dry flow of electrostatically charged sorbent particles into a polluted gas stream. A dry system is thereby provided for the removal of essentially all pollution particles and gases in a polluted gas stream. Which system does not generate acid mist, can be operated at high temperatures of up to two thousand (2000) degrees F., and provides for operating under less than atmospheric pressure to pull the gas stream therethrough. The hopper system and electrostatic gun 12 provide, respectively, an ability to verify and control the flow rate of sorbent materials for a particular gas stream pollution condition, and for varying the electrostatic gun configuration and the electrical power supplied thereto to fully charge all the particles in that sorbent material flow. With the charged sorbent particles then injected and dispersed into the polluted gas stream. The hopper system 11 and electrostatic gun 12 lend versatility to the apparatus 10 that can accordingly be utilized to remove essentially all the pollution particulates in different configurations of polluted gas streams. The preferred apparatus 10, additional to the hopper system 11 and electrostatic gun 12 of the invention includes a combination of moving and static filter beds 13 and 14, respectively, wherethrough the flow of agglomerized pollution and sorbent particles are removed. Whereafter, the now clean gas stream is vented to atmosphere, and the agglomerized particles as have been removed from the filter beds can be disposed of or recycled.

Shown in FIGS. 1, and 3 through 6, the apparatus 10 includes the electrostatic gun 12 and, optionally, electrostatic gun 12a, that receive a flow of sorbent from hopper system 11, shown in FIGS. 1 and 2 and discussed below. The hopper system 11, is shown best in FIG. 2, includes a hopper 15, that can be a rectangular or other shape of bin that is shown as open across a top end for receiving and containing a volume of a dry sorbent material as have been selected to react with the particular pollutants contained in the polluted gas stream that is illustrated as arrow A in FIG. 1.

Thought, it should be understood, the hopper system II can be a number of configurations, including an open top, depending upon application and conditions, except where moisture is present. It must be scaled. Further, the hopper system II, as required, can be a taker or silo, and can be configured to provide a gaseous sorbent such as ammonia, within the scope of this disclosure. The selection of a particular dry sorbent material is based upon a requirement that it react with the pollutants that are present in and are to be removed from a polluted gas stream. For many applications fine particulate lime is selected, as for example lime particles are suitable for the removal of pollutants from a gas stream emitted by a coke oven, stinter plant or steel-making furnace. Whereas, for coal-fired boilers, the selected sorbent material ma be nacholite that will react with sulfur dioxide in the gas stream to form sodium sulfate that will adhere to the sorbent particles. The material selected for the sorbent is therefor determined by the pollutants to be removed from that stream. Which dry sorbent material is reduced to fine particles of approximately 15M (micron) that also equals 200 mesh to 1 mm in diameter before loading into the sorbent hopper 15 for passage from the sorbent system 11 to the electrostatic gun 12. Wherein, the individual sorbent particles are each electrostatically charged and injected into the polluted gas stream, shown as arrow A.

The hopper 15 is selected to have an appropriate capacity for a selected dry sorbent material flow rate into the electrostatic gun 12 for electrostatic charging. The dry volume of sorbent particles to provide, when charged and dispersed into the polluted gas stream, for fully charging or interacting with all the pollution particulates therein. In practice a hopper capacity of one (1) to several thousand cubic feet is appropriate for the invention, depending upon the system requirement for the content of particular pollutants are present in the gas stream. Dry sorbent materials are gravity fed or air transported from hopper 15 into a mass flow hopper 16 that measures a volume of dry sorbent materials and passes that measure, as by turning paddles 18, that feed the materials into a helix or screw feed 17. The helix or screw feed 17 is turned by a motor to move the measure of dry sorbent materials through a discharge nozzle 19. The selected measure of dry sorbent materials is determined for the volume of pollutants as are present in the gas stream, and the invention employs either a volumetric feed system or a loss-in-weight system to proved this measure. Where a very accurate volume flow of the dry sorbent materials is required, the loss-in-weight system, is generally more accurate, and is preferred. Examples of such feed systems are identified as dry sorbent feeders and are currently manufactured by AccuRate, Inc., by Vibra Screw, Inc., by KTron, Inc., by AutoWeight, Inc., and others. With, in practice, the selection of which feed system dependant upon its cost and capabilities for meeting the need to provide a required closely controlled flow of dry sorbent materials to the electrostatic gun 12.

Figure 2:
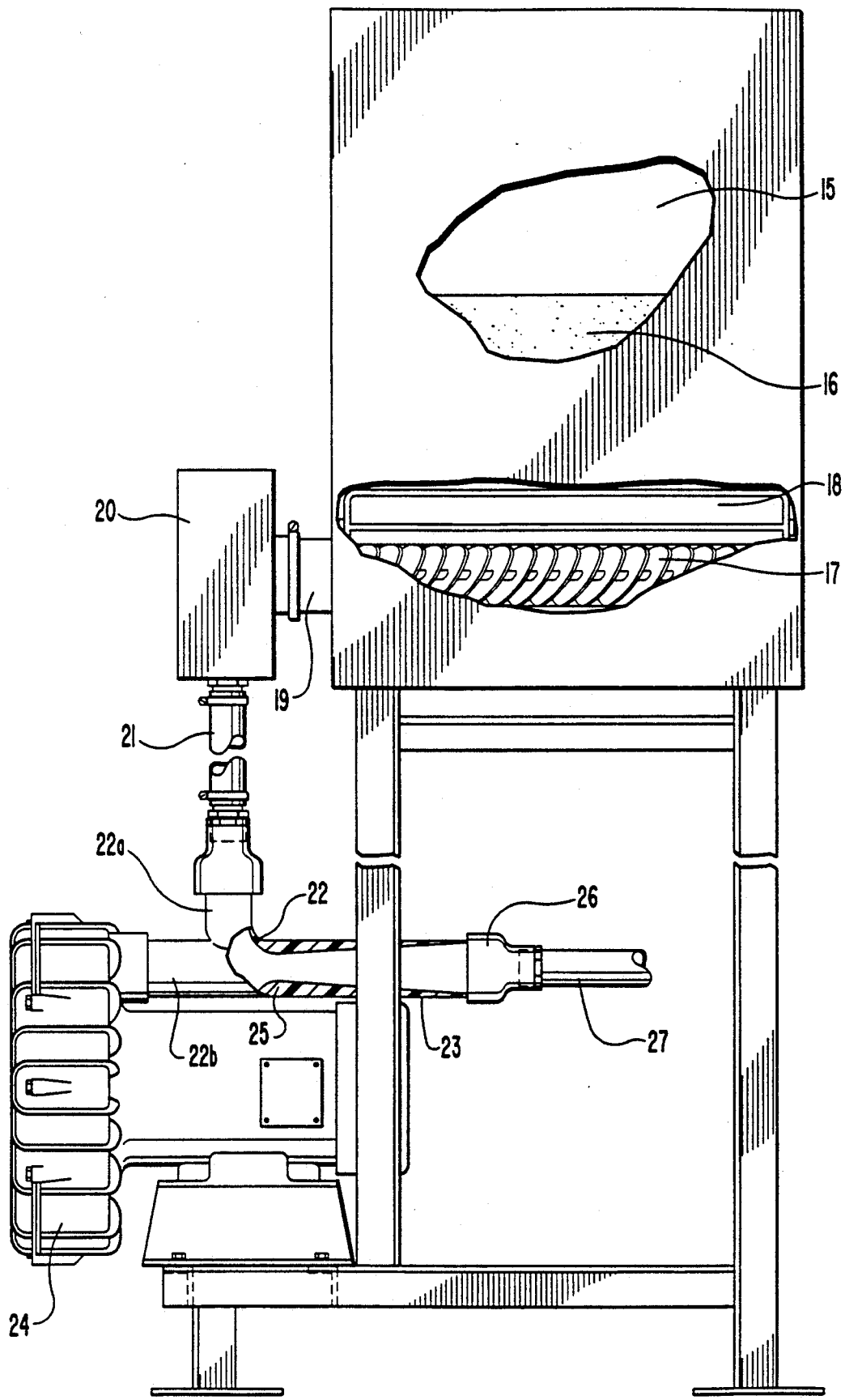
FIG. 2 is an enlarged side elevation perspective view of the hopper system of FIG. 1 that provides for passing a measured volume of sorbent materials into a venture throat wherein that flow is mixed with volume of air under pressure and is passed into a barrel of the electrostatic charging gun of FIG. 1.

Shown in FIGS. 1 and 2, and best in FIG. 2, the measured volume of dry sorbent materials is fed through a tee 20 and into a feed line 21 that empties into a tube section 22a that is one leg of a Y fitting 22 of a venturi line 23. An adjacent tube section 22b that is the other leg of the Y fitting 22 is connected to receive a discharge of air, under pressure, from a blower 24. The blower 24 provides a controlled volume of air introduced to suspend and maintain in suspension the measured volume of dry sorbent material. In practice, a regenerative blower that is capable of providing a closely controlled output volume of pressurized air to be suitable for use as a component of the invention is preferably a regenerative blower like that manufactured by Spencer, Inc., by Gast, Inc., by Roton, Inc., and others, all of which could be used within the scope of this disclosure.

Shown in FIG. 2, air and sorbent material mixing takes place in a venturi throat 25 that is arranged downstream from the of tube sections 22a and 22b of the Y fitting 22, which throat narrows from its upstream end to provide a velocity increase therethrough for thoroughly mixing the dry sorbent materials and pressurized air. In practice, the flow of dry sorbent materials entrained in air is preferably maintained at a pressure of from one (1) to ten (10) PSI. Downstream from the venturi throat 25, the venturi line widens for fitting into a bell end of a reducing coupling 26. The coupling 26 connects to a sorbent material feed line 27 that, in turn, connects into the electrostatic gun 12.

Figures 3, 4:
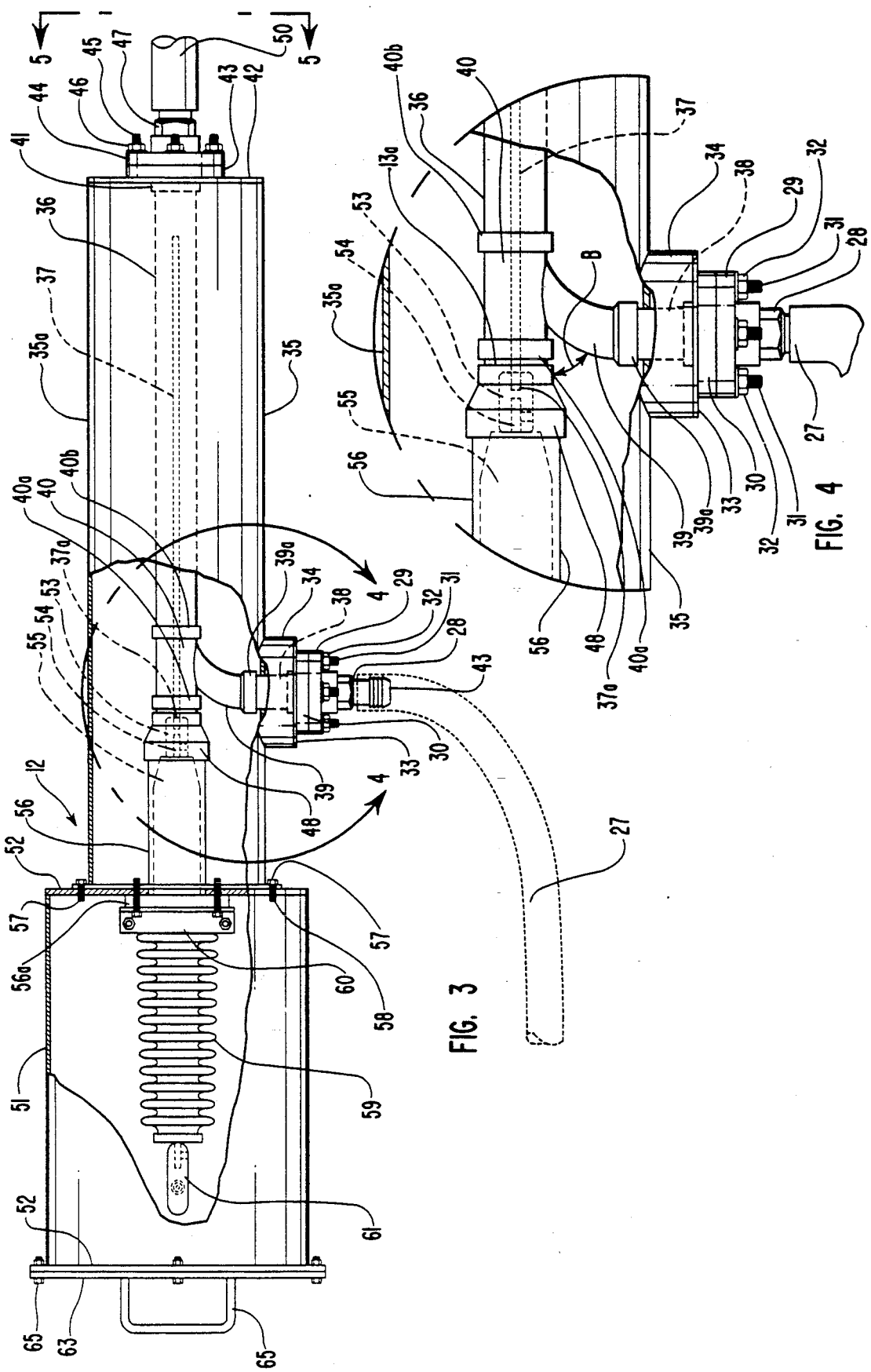
FIG. 3 is an enlarged side elevation view of a first embodiment of the electrostatic charging gun of FIG. 1, showing the gun housing with sections thereof broken away to expose an insulator and a barrel thereof, and showing, in broken lines, a charging wand that is fitted and maintained longitudinally in the center of the barrel.
FIG. 4 is an enlarged sectional view taken within the line 4—4 of FIG. 3.
Figure 5:
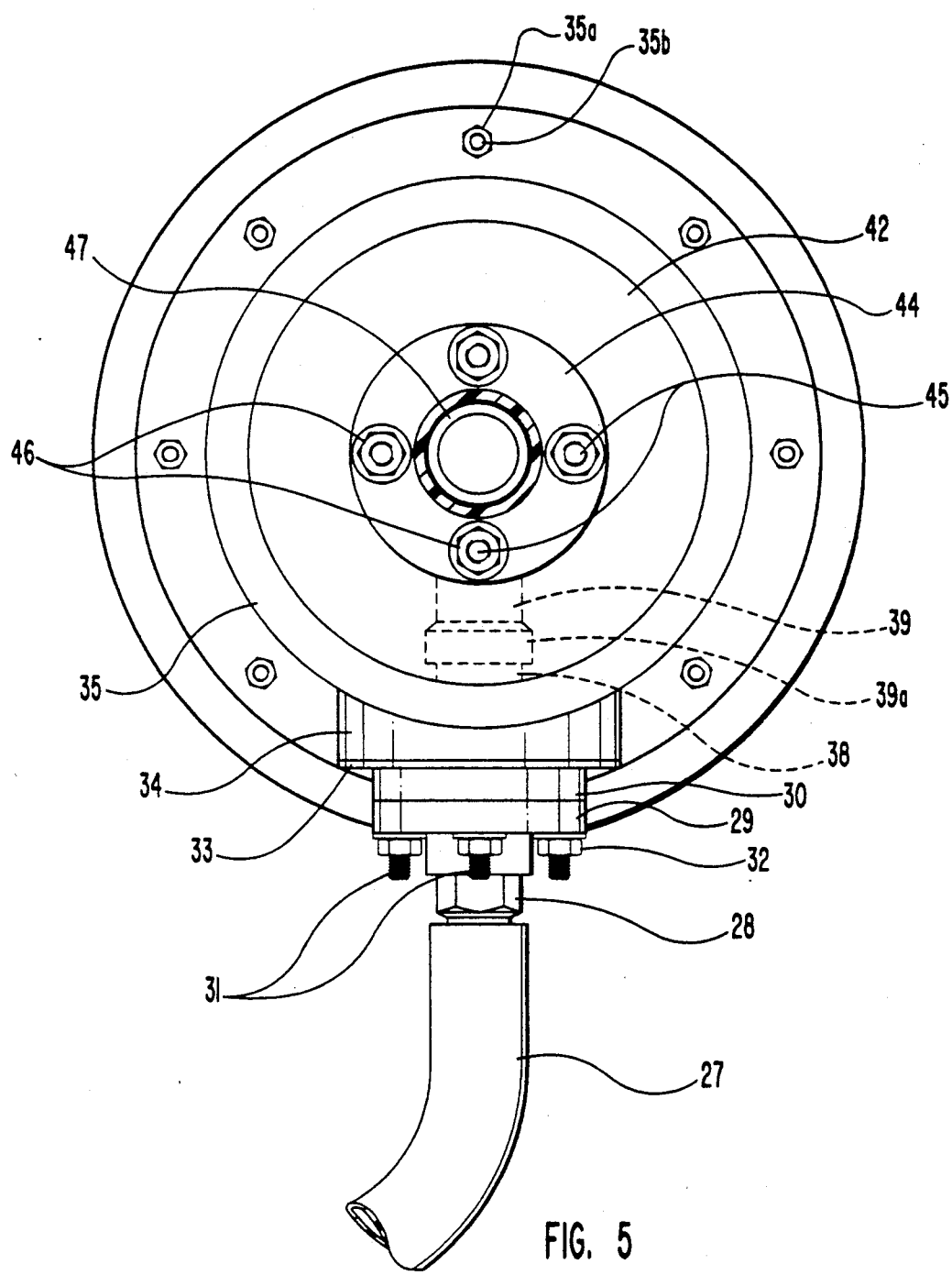
FIG. 5 is a forward end sectional view taken along the line 5—5 of FIG. 3.

A first embodiment of electrostatic gun 12, is shown in FIGS. 3 through 5 and is arranged to receive the flow of dry sorbent and entrained air, under pressure, through feed line 27. The feed line 27 connects to a sorbent inlet fitting 28 of the electrostatic gun 12 that is mounted into a center of a coupling plate 29 arranged across a gun coupling plate 30. The plates 29 and 30 are shown maintained together by fitting bolts 31 through aligned holes formed through the plates with nuts 32 turned thereon. The coupling plate 30 is maintained to an end plate 33 of a right angle port 34 that is formed in a rear section of a gun cylindrical housing 35. As shown, the gun cylindrical housing 35 contains a straight smooth walled barrel 36, as shown in broken lines in FIG. 3 and in solid lines in FIG. 4, hereafter referred to as barrel. The flow of air entrained sorbent particles is passed into the barrel 36 that contains, longitudinally center therein, a charging wand 37, shown in broken lines, whose function is set out in detail below. The gun coupling plate 30 mounts, at a right angle, a connecting tube 38, that is shown in broken lines, that, in turn, connects into a collar 39a end of a sorbent inlet 39. The sorbent inlet 39 of FIGS. 3, 4 and 5, in turn, mounts a coupling collar 39a across its end opposite to its junction with barrel 36. A tube 38 that mounts to end plate 33 is shown telescoped into which coupling collar 39a, with the end plate 33 for closing over the end of a right angle port 34 that is formed into the side of the cylindrical housing 35. The end plate 33 is shown to also include a mounting disk 30 secured thereto that is for receiving a like disk 29 fitted and bolted thereto. The disk 29, in turn, mounts a fitting 28 that connects to sorbent feed line 27, for passing the flow of sorbent particles entrained in air under pressure from the sorbent hopper system 11.

The sorbent inlet 39, as shown, is curved and connects into a rear end of the barrel 36, at approximately a right angle, shown as angle B. Which sorbent inlet 39 and barrel end coupling, shown as a sleeve 40, have coupling collars 40a and 40b arranged on opposite ends thereof. The coupling collar 40b is shown as receiving a rear end of barrel 36 fitted therein, forming the barrel rear or breech end. The barrel 36 forward end, as shown in FIG. 3, is maintained to a coupling fitting 41 that extends through a barrel forward end covering plate 42, and is secured to a rear mounting plate 43. A forward mounting plate 44 is for fitting over the rear plate mount 43 and is secured thereto by installing bolts 45 through aligned holes in which plates 43 and 44 and turning nuts 46 there over. A line coupling 47 is shown extending from the forward mounting plate 44 center for coupling to a sorbent outlet line 50. Shown in FIGS. 3 through 5, barrel housing mounting rods 35a, with nuts 35b turned there over, are provided for fitting through the forward end cover plate 42, to extend the barrel length and are fitted through a forward end 52 of an insulator housing 51, securing the barrel housing 35 to the insulator housing 51.

As set out above the barrel 36 contains the wand 37, that extends essentially the length thereof and connects, at a rear end 37a, into a coupling 53. The barrel 36 is smooth walled and can be formed of a P.V.C. type plastic, silicon rubber, ceramic, or the like, with the wand 37, preferably formed of an electrically conductive material, centered longitudinally therein. The wand 37 is to provide a high voltage corona discharge there around that will impart a strong electrostatic charge onto each of the sorbent particles that pass through the barrel 36.

As set out above, the hopper system 11 provides for different volumes of sorbent particles to be passed through the sorbent inlet line 39 into the electrostatic gun 12 for charging, which electrostatically charged particles are then entrained in the gas stream for charging the pollutants particles in that gas stream. Accordingly, for the invention to accommodate, and properly fully charge all the sorbent particles as are entrained in the flow, the voltage passed to the wand 37 is preferably variable. To provide such a variable voltage to wand 37, as shown in FIG. 1, a power control 66 connects to a high voltage power supply 67. Which power supply 67 can provide a power output, as set at the power control 66, of between 5,000 and 200,000 volts. In practice, a high voltage power supply manufactured by Spellman, identified as a High Voltage Power Supply has been used successfully for this invention.

The power control 66, as shown in FIG. 1, is preferably a control panel where an operator, not shown, can input a required voltage to the wand 37 so as to produce a corona effect there around for providing a required strong electrostatic charge to the individual sorbent particles, charging each negatively or positively. To further lend versatility to the invention, the smooth walled barrel 36 is arranged to be removable and replaceable with different diameters of barrels to accommodate different sorbent flow rates. In practice, the invention has employed, in one model, a two (2) inch diameter barrel that is capable of conveying from one hundred fifty (150) to three hundred (300) cubic feet per minute of combined air and dry powered sorbent material, and in another model has utilized a three (3) inch diameter barrel that is capable of conveying three hundred (300) to five hundred (500) cubic feet per minute of combined air and dry powered sorbent material. It should therefore be understood that a variety of diameters of barrels 36 could be so employed within the scope of this invention.

Shown in FIGS. 3, 4 and 5, the electrostatic gun 12 includes a cylindrical insulator housing 51 wherein is contained a high voltage insulator 59, that is preferably a ceramic insulation and is shown mounted onto one end to a base 60 to extend longitudinally within the center of the insulator housing. The opposite end of the high voltage insulator 59 is shown to include a connector 61 that is for electrical connection through a cable, not show, to the high voltage power supply 67. The connector 61 connects to an internal conductor that extends longitudinally through the center of the insulator 59, and through a ceramic subinsulator 55. To pass a high voltage through a conductive coupling collar 54, into the end 37a of wand 37. The wand 37, as shown, is centered within the smooth walled barrel 36 that, as set out above, is connected on a rear end adjacent to the sorbent inlet 39 to a collar 48, and on a forward end through a plate 42 line coupling 47. The line coupling 47 connects to a line 50 to transfer the charged dry sorbent materials into an injection module 69 that provides for injection of the charged sorbent particles into the gas stream, arrow A, that is shown through tube 68.

For mounting the barrel 36 the smooth walled barrel 36 rear end is shown best in FIG. 3 is connection through the collar 48 to a cylinder 56 that contains the ceramic insulator. The cylinder 56, in turn, mounts, a coupling collar 36a across its rear end that is fitted through a forward plate 52 of the insulator housing 51 and is bolted to a voltage insulator base 60 and to a rear flange end 57 of the cylindrical housing 35. The components of the electrostatic gun 12 are thereby contained within the respective cylindrical barrel housing 35 and insulator housing 51. The insulator housing 51, is shown capped across its rear end by an access plate 63 that is secured thereto by bolts 64 and includes an outwardly extending handle 65.

Figure 6:
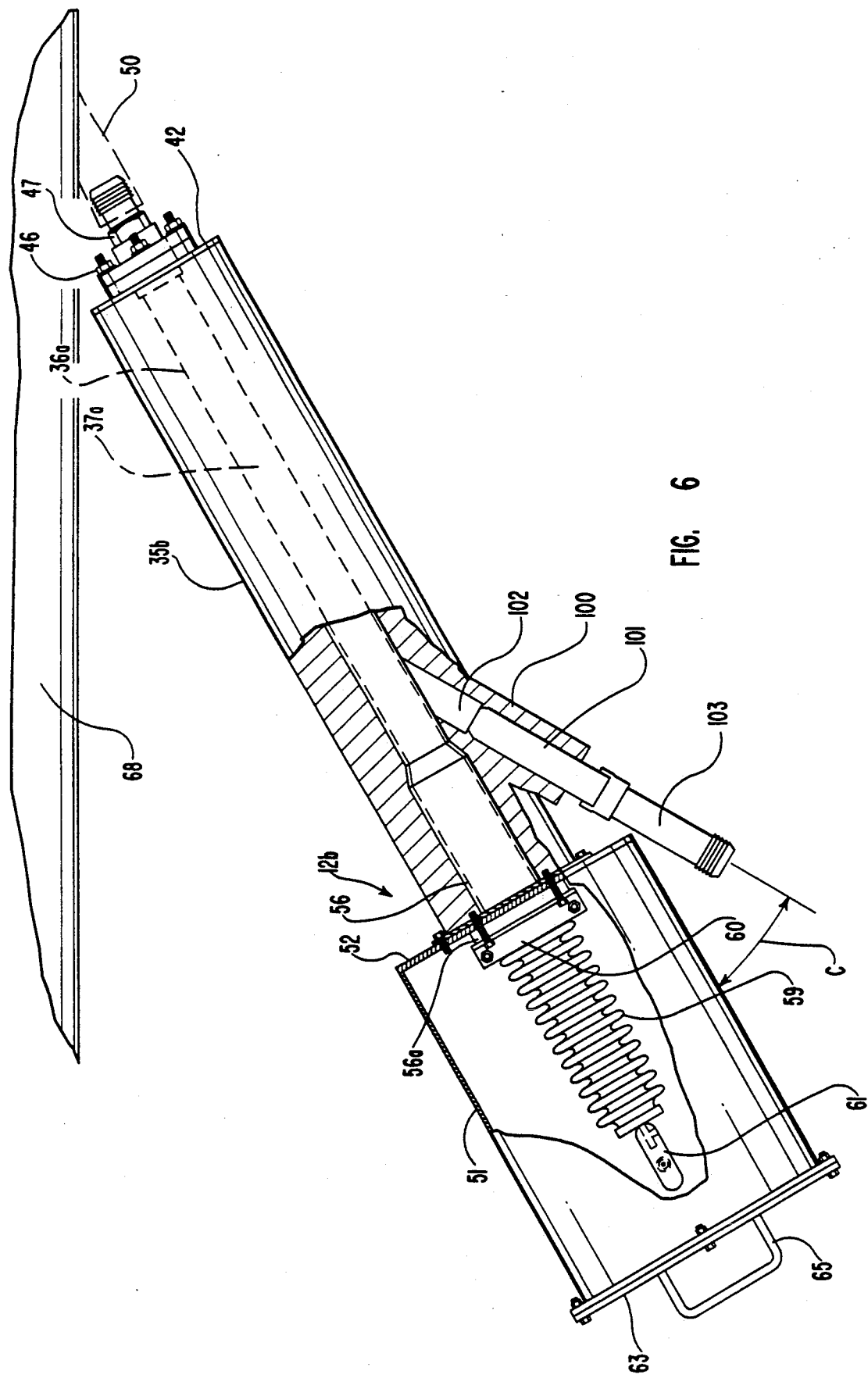
FIG. 6 is a view like FIG. 3 only showing another embodiment of an electrostatic charging gun of the invention that ca be formed from a ceramic material, silicone rubber, or Poly-propelene plastic.

As shown best in FIGS. 3 and 4 and discussed hereinabove, the barrel 36 can be a metal, ceramic, P.V.C. type plastic, or the like, and the sorbent inlet 39 is preferably bent through approximately a right angle with respect to the barrel 36. In a second electrostatic gun 12b as shown in FIG. 6, for a ceramic barrel 36a and sorbent inlet 102 combination the inlet angle of a sorbent inlet, shown as angle C, is approximately thirty (30) degrees from horizontal. Which ceramic electrostatic gun 12b includes, as part of the sorbent inlet 102, a sleeve 100 that is formed as part of the barrel housing 35b. The sleeve 10, contains the sorbent inlet 102 that is coupled to a connection tube 101 that telescopes into a ceramic coupling connector 103 which is itself connected into the inlet line 27, as shown in FIGS. 3 and 4. Structurally and functionally the ceramic barrel 36a, wand 37a barrel housing 35b insulator 59 and insulator housing 51 are essentially like those of the electrostatic gun 12 and, accordingly, the components of the ceramic electrostatic gun 12a barrel 36a and barrel housing 35b, insulator and insulator housing utilize the same numbers.

In practice, sorbent particles are transferred at a pressure of approximately 1 to 5 psi through sorbent feed line 27 that has an approximate diameter of 2 to 3 inches, and travel into the barrel 36 that contains the wand 37. The invention provides a capability for varying the sorbent particle flow for a specific volume of pollutants as are content in the gas stream, arrow A, and for varying the electrostatic charge imparted into the sorbent particles. Which particle charging is controlled by an operator, not shown, who operates the control panel 66 to appropriately vary the voltage that is present at wand 3 to provide desired strong electrostatic charge imparted to each sorbent particle for the sorbent material flow. For a sorbent material flow of from 1 to several hundred pounds per hour, a voltage of 5,000 to several 100,00 volts is selectively passed to wand 37. Which voltage is dependent upon the distance of the electrostatic gun 12 end fitting 47 outlet and a first filter media bed and takes into account the size of pollution particles in the ga stream that must be removed. Voltage to the wand 37 is thereby controlled to maintain a uniform high voltage corona discharge there around, along its entire length, to negatively or positively charge each sorbent particle that passes through barrel 36 or 36a.

The particles of sorbent materials that pass by the electrically charged wand 37 are then injected through the charged dry sorbent injection module 69, shown in FIG. 1, and travel into a tube 68 that contains the polluted gas stream, arrow A. Therein, the sorbent particles, that all bear the same negative or positive charge, tend to repel one another and are rapidly dispersed throughout that polluted gas stream. A utilization, as is preferred in a practice of the invention, of very finegrained sorbent particles tends to significantly increase the sorbent's activity, and considerably reduce the residence time required for their complete dispersion into the polluted gas stream. The charged particles themselves attract both submicron and larger particulates in the gas stream, gathering them onto the sorbent particles surface, thereby agglomerating them to form larger particles. Additionally, the charged sorbent particles are selected for chemically reacting with pollutants in the stream and provide a large charged area for charging particulates that are not already agglomerated. The gas stream and entrained sorbent is then directed into a collection system 70.

The polluted gas stream that flows into the tube 68 arrow A, is from a plant discharge. Dependant upon the pollutant character and volume in the stream flow, a single electrostatic gun 12 may be sufficient to provide a required flow of electrostatically charged sorbent particles into that gas stream to provide for fully charging of all the particulates in that flow, include submicron size particulates. Where it is determined that a single electrostatic gun 12 will not provide sufficient. Capacity, even with a capability for an increase or decrease in the capacity thereof by a setting of a required output from the hopper system 11 and a selection of the size of barrel 36 and controlling the voltage transmitted to the wand 37, the invention can include a second, third of more sorbent injection electrostatic gun or guns 12a, as illustrated in broken lines in FIG. 1. Each electrostatic gun to function, as described above with respect to the discussion of electrostatic gun 12. Such second and additional sorbent injection electrostatic gun 12a or guns, it should be understood, is preferably identical to the electrostatic gun 12 and so a description of electrostatic gun 12, along with hopper system 11, and their functioning should be taken as a description of a second or third sorbent injection gun 12a and the hopper system therefore also.

The hopper system and electrostatic gun 12 of the invention, as set out above, are for supplying electrostatically charged sorbent particles to a pollution collection system that is like that of the present inventors set out in their U.S. patent application, Ser. No. 08/075,957 for an "Apparatus For Removing Particulate Matter and Gasses From a Polluted Gas Stream" and as set out in a U.S. patent application of the inventors Ser. No. 08/077,740 for a "Method for Removing Particulate Matter and Gasses From a Polluted Gas Stream". Though, it should be understood, the invention could be included with other pollution collection systems that utilize charged sorbent particles, within the scope of this disclosure.

The invention, for the purposes of this disclosure, is preferably included with an apparatus for removing particulate matter and gaseous pollutants from a polluted gas stream that includes collection system 70, as shown in FIG. 1. The collection system 70 is arranged for receiving the polluted gas stream and entrained electrostatically charged sorbent particles and preferably includes two distinct collection areas. A first collection area is a transition section formed as a pyramid with inwardly sloping walls 71 from a wide base that meet at an apex that connects to the tube 68. The transition section receives the gas stream through the apex nozzle, that is approximately the same diameter as the end of tube 68, and wherethrough the gas stream and entrained pollution and sorbent particles travel. Walls 71 of the transition section slope outwardly from the apex to present a large square or rectangular base area that is opposite to the apex nozzle and is connected to an end of a filter housing 72. The transition section 70 is open therethrough and preferably contains, centered therein, a diffuser cone, not shown, or a like device to spread the gas stream flow outwardly over the area of a first of a series of moving filter beds 13 that is arranged across the filter housing, opposite to the transition section 70. The gas stream that passes through the transition section and is dispersed around the diffuser cone experiences a radical change in velocity from the apex nozzle to the moving filter bed 13. With that change in velocity, heavier agglomerized particles as have been entrained in the gas flow will tend to fall out of the flow in front of the first filter bed. Which first filter bed is positioned across, so as to fill, the area opposite to the transition section large square or rectangular base area.

Shown in FIG. 1 the transition section connects to an upstream end of the filter housing 72 that houses the moving and static filter beds 13 and 14 that are for removing particulate matter from the gas stream, cleaning that gas stream that is then vented out of an exhaust stack 93. The gas stream that is passed through exhaust stack 93 is pulled through a vent tube 90 by a fan 92. The filter housing 72 is shown as having a rectangular box shape and mounts a number of spaced filter media hoppers 80 at intervals along the housing top, each for passing filter media materials into to replace the filter media material 73 and 75 in the moving and static filter beds 13 and 14, respectively as set out hereinbelow. The filter housing 72 contains the series of spaced apart vertical moving filter beds 13, and at least one static filter bed 14.

Shown best in FIG. 1 the first of the series of moving filter beds 13 is arranged opposite to the transition section 70 apex, to receive the polluted gas stream with entrained electrostatically charge sorbent and pollution particles from the discharge end of tube 68. The moving filter beds 13 each include a bed of filter media material 73 that is maintained between front and rear plates 74. The media materials are gravity fed from hoppers 80, to capture, as they travel downwardly from the hoppers agglomerized pollution and sorbent particles and to react with any submicron pollution particles left in the gas stream as it is passed therethrough. From each bed, the media material is passed out from the bottom of each moving filter bed for reprocessing. The media material that moves from top to bottom in each moving bed filters 13 can be the same as or different from the media material used in the static filter bed media material 75.

Three moving filter beds 13 and a single static filter bed 14 are shown herein. It should, however, be understood that, dependant upon the system requirements for removal of pollution particulates from a particular gas stream, only one moving filter bed 13, or a number of moving filter beds 13 can be utilized as are required to completely clean the gas stream, and more than one static filter bed 14 can also be used. It should also be understood that a description of one of the moving filter beds 13 and the static filter bed 14, as set out herein, and their accompanying component structures should be taken as a description of the other moving filter beds 13 and another static filter bed 14, and their accompanying components, also.

As set out above, the moving filter beds 13 each include the bed of media material 73 that is maintained between front and rear plates 74 are preferably punched with a number of holes 76 formed therethrough that essentially allow for an unobstructed passage of the gas stream through the media material 73. The media material 73 is preferably a gravel with the spacing between the front and rear plates 74 to be approximately twelve (12) inches with the beds extending fully across and between top and bottom surfaces of the filter housing 72. The media material 73 is selected for removing the particular pollutants as are contained in a polluted gas stream and may be silica gravel, limestone gravel, an artificial material, or the like, within the scope of this disclosure, functioning as set out below. The media material 73 may be the same for the first, second and third filter beds 13, respectively, as shown in FIG. 1, or may be or different materials as illustrated in Examples 1 and 2 set out later herein.

The media material 73 that makes up the moving bed filter 13 is passed into the filter top end from a valve arrangement that is preferably a rotary airlock and is utilized for maintaining pressure within the filter housing 72 at less than atmospheric. The media material from hopper 80 travels through the filter bed responsive to gravity and as controlled by operation of a rotary discharge valve at the bottom of the filter bed. The rotary discharged valve is preferably a paddle wheel device, but can be another appropriate valve structure, within the scope of this disclosure, and extends fully across the bottom of the filter bed, from wall to wall. The discharge valve is arranged above a catchment hopper that receives the media discharged material containing captured agglomerized pollution and sorbent particles. The gas stream travels through the filter media material cross current to the direction filter media material travel, with the bed operating a plug flow mode. Where, on sensing a certain change in pressure across the bed, the rotary discharge valve is operated to change the bed media material. Additionally, another airlock may be provided below the rotary discharge valve for passing media materials and agglomerized particles onto a media screen. The rotary discharge valve and airlock to operate to provide a closed system that is operated below atmospheric pressure. The system contained in the filter housing 72 is therefore closed as to be capable of and is preferably operated at less than atmospheric pressure for providing a vacuum effect to pull the gas stream therethrough. In practice, the preferred system is operated at from 1 to 24 inches of water below atmospheric conditions. This operating pressure provides for increase in the efficiency of the separation of pollutant gases as are entrained in the gas stream, that are precipitated onto the surface of the filter bed media particles.

A chemical reaction for which reaction where hydrated lime or ammonia is used as the sorbent material to remove $SO_2$ gas contained in the gas stream is as follows:

$$Ca(OH)_2 + SO_2 \rightarrow CaSO_3 + H_2O$$

$$2(NH_3) + SO_2 + H_2 \rightarrow (NH_4)_2SO_3$$

Further, the preferred closed system facilitates operations at high temperatures of up to two thousand degrees F. Which high temperature operations both significantly improve system efficiency and are an effective bar to a generation of an acid mist as a product of a chemical reaction as could damage the equipment. For example, to maintain an operating pressure less than atmospheric within the filter housing 72, the rotary discharge valve that controls media material falling under the urgings or gravity between the front and rear plates 74 is operated responsive to a sensed pressure drop across the moving filter bed 13. When such pressure drop is sensed as a difference in pressure between sensors that are positioned on forward and rear sides of the moving filter bed 13, this indicates that the media material 73 is plugging. The rotary discharge valve is then operated to pass clogged media material therethrough. The contaminated media materials passed out of the airlock and onto a media screen whose function is set out hereinbelow. As the plugged media materials are vented, the bed is replenished with materials from the feed hopper 80 that fill the area of the moving filter bed 13 between the forward and backside plates 74.

Media material movement in the moving filter beds 13 causes some media material particles to be ejected through the openings 76 formed in forward and rear 74, respectively. This particle flow keeps the holes open so as to provide a free flow path to the gas stream. Such ejected media material particles fall into a catchment skirt arranged across the front of the moving and static filter beds 13 and 14, which skirt also receives the heavy particles that fall out of the gas stream due to a reduction of the gas stream velocity in the transition section 70 and on contact with the forward plate 74. Such particles are mixed with the filter media materials that pass through the rotary discharge valve.

As set out above, the sorbent particles and media materials that pass from the catchment hopper through rotary discharge valve and airlock are deposited onto a media screen. The media screen is moved back and forth to shake off the agglomerized sorbent and pollution particles that have adhered to the media material. The cleaned media material particles are then moved to the hopper 80, as set out below, for re-feeding back through the moving filter beds 13. Media material losses at the media screen are made up from a media hopper 94 that passes media particles through a line for introduction, along with the cleaned and screened media material back to hopper 80. Which media material travel, as shown in FIG. 1, is upward and horizontal through conveyor shafts 81 that feed media materials into hopper feed lines 82 that dump the clean media materials through airlocks 83 into individual hoppers 80, refilling the hoppers that supply media material to each moving filter bed 13.

As set out above the description of the first moving filter bed 13 in the series should be taken as a description of all the moving filter beds. In practice, the first moving filter bed 13 will collect between seventy five (75) to ninety five (95) percent of the particulate material entering the system. Which collected material includes the agglomerized pollution and sorbent particles and sorbent reacted particulates. The remaining moving filter beds remove essentially the balance of the particulate material in the gas stream and react with essentially all the pollution gases contained therein. Accordingly, with different sorbent flow rates as provided for by the invention, the system can be utilized for removing pollutants from any number of polluted gas streams as could require more or less than the three (3) moving filter beds shown, within the scope of this disclosure. Also, for some applications, it may be required or desirable to utilize a different size of media material particles from those utilized in the first moving filter bed 13, and subsequent beds. Further, it may even be preferably to utilize different media materials in the moving filter beds 13, as set out in Examples 1 and 2 below. Such utilization of different size of media material or of different type or types of media materials as the filters for the individual filter beds will, of course, require a utilization of a different media material replenishment arrangement than that shown in FIG. 1, to include individual media hoppers 80 and feed lines.

The static filter bed 14, shown in FIG. 1, as set out above, is preferably arranged across the interior of the filter housing 72 to receive the gas stream after it has passed through from the last in the series of moving filter beds 13. The static filter bed 14 is provide to finally remove essentially all the sorbent particles, agglomerated particles and gaseous pollutants as may still be present in the gas stream after its passage through the moving filter beds. The media material 75 for of the static filter bed 14 can be changed, but that change is not normally made during an operation cycle as the materials it picks up during operations are generally insufficient to create plugging. The static filter bed 14 is, however, periodically purged during system shutdown or when an appropriate pressure drop thereacross is sensed. The static filter bed 14 as it is also housed in the filter housing 72 is, preferably, the same size as the moving filter beds 13, and may be the same, greater, or lesser thickness, within the scope of this disclosure. The static filter bed media material 75, like the moving filter beds media material 73, is contained between forward and rear plates 76 that are preferably punch plates and include a large number of holes formed therethrough.

The static filter bed 14 serves as a polishing filter and is static because any movement of the bed, no matter how slow, will cause a release of the collected particulate materials. Accordingly, purging of the static filter bed is usually undertaken prior to system start-up or after shutdown. However, for example, where a pollution removal system is to operate continuously, two static filter beds, can be utilized. The beds are arranged such that the air stream can be directed around a static filter bed 14 as has become plugged by fitting of a baffle plate, or the like, into the filter housing 72 to redirect air stream flow into a conduit around the first static filter bed and into an alternative or second static filter bed, not shown. After passage, the air stream is then directed back to an exhaust conduit and into the exhaust stack 93. With the air stream redirected around the first static filter bed 14, its media material 75 can be emptied and refilled with clean media material and the air stream flow restored.

A hopper 84 is provided for feeding media material into the static filter bed 14 that receives recycled and new media materials through a vertical supply line 85. The vertical supply line 85 dumps into a horizontal line 86 that feeds the hopper through valve 87. The new media materials can also be transferred from supply hopper 94, or otherwise supplied. During system operation the valves feeding and discharging media materials into and from the static filter bed 14 are closed for preventing infiltration of outside air into the unit. After shut-down, static filter media material 75 is discharged into a purge bin that directs that flow to a media screen, not shown. The static filter bed media screen, like moving filter bed media screen, to provide for the removal of agglomerized particles, is arranged to be shaken to remove particulate matter from the media material. The clean media material is then transferred to and through vertical line 85 for mixing with media materials from the supply hopper 94.

Operation of the component systems of the apparatus 10, is preferably provided by electrically operated devices, such as blowers and motors. Which devices, it should be understood, are preferably relatively low horsepower motors and/or require relatively low horsepower to operate, thereby providing a simple and robust system that is inexpensive to use and maintain.

Examples of the operation of the apparatus 10 of the invention for removing essentially all pollutants from a gas stream are set out and discussed hereinbelow as Examples 1 and 2:

EXAMPLE 1

This is a hypothetical example of apparatus for removing particulate matter and gaseous pollutants simultaneously from a gas stream generated by a copper smelter. Reference is hereby made to FIG. 1:

A gas stream A flow rate of 35,000 ACFM at a temperature of 350 degrees F. has a particulate grain loading of 5.0 gr./DSCF and a gaseous pollutant of $SO_3$ with a grain loading of 1.0 gr./DSCF, the primary pollutants in this gas stream. Other pollutants are associated with the gas stream, but are a minor importance in the overall clean up of the gas stream. A modeling program is specifically designed for sizing of the hopper system of the invention to provide for a desired sorbent material flow and in entrained air to fully react with the gras stream pollutants. For this example, the sorbents to be used for the cleaning of the gas stream will be Hydrated Lime $Ca(OH)_2$. The rate of feed for the electrostatically charged hydrated lime will be 155 pounds per hour permitting the use of a single dry sorbent electrostatic gun 12, that has a two (2) inch diameter barrel.

One hundred fifty five pounds per hour of hydrated lime, fine grained $-200$ mesh, is feed from the sorbent storage hopper system 11 to the electrostatic gun 12 wherein an electrostatic charge of 80,000 volts is applied to the fine grained hydrated lime particles from the high voltage power supply 67. The voltage charge on the hydrated lime is determined upon the results of a screen analysis on he particulate matter pollutants that must be removed, the distance the charging gu is located from the moving media first filter bed and the amount and type of sorbent used. The charge will be a variable charge, depending on site specific information that is part of the modeling program. The hydrated lime after being electrostatically charged is feed into the charged dry sorbent injection module 69, which feeds the electrostatically charged hydrated lime into the polluted gas stream. The charged sorbent rapidly disperses into the gas stream, providing a large charged surface area for inducing the electrostatic charge onto the particulate matter entrained within the incoming gas stream and to supply a large area for the chemical reaction between the sorbent and the gaseous pollutants to react in. From the injection module 69 to the transition section, a chemical reaction between the hydrated lime and the $SO_3$ takes place, creating $CaSO_4$, or gypsum, and the charged hydrated lime sorbent agglomerates the particulate material, more specifically the PM-10 particles, this area is more specifically called the residence area or zone, which may or may not contain a specially constructed residence chamber.

The transition section has a much greater area than the gas stream line 68, causing a rapid decrease in the gas flow velocity. This change in velocity causes some of the heavier particulate particles and sorbent reacted gaseous pollutants in the gas stream to precipitate out of that flow, falling in front of a plurality of vertical moving media bed filters. The vertical moving media bed filters, in this case are charged with two types of media material, sized to $-\frac{3}{8}$ inch to $+5$ mesh. The first moving media bed filter is charged with limestone, a product used by a copper smelter in the smelting process, is used were to further enhance the reaction of $SO_3$ and to insure maximum clean up of the gaseous pollutants from the gas stream. The remaining second and third moving media bed filter and the static filter are charged with slag, a by-product of copper smelting process, that will save on the screening costs of the material providing a cost savings to client, and will help in the recovery of volatilized copper, gold and silver, which is collected in this process, but is typically lost or not collected in conventional pollution control systems or devices. Any pollutants that have no economic value will be consumed in the smelting process or entrained in the slag from the smelting process and disposed when the slag is drawn off and transported to the smelters slag disposal area, thus reducing handling problems associated with the disposal of collected fines and sorbent reacted material as in other processes.

The second and third moving media bed filter and the static media bed filter material will be set up to recycle the slag, screening any collected particulates and sorbent reacted gaseous pollutants from the slag media, providing for reusing the screened media material slag that is sent back into the second and third moving media bed filter and the static media bed filter. The particulates and pollutants screened from the media, will be sent directly into the smelting process to further recover any volatilized copper, gold and silver and to dispose of any particulates and collected pollutants of non economic value into the clients slag from the smelting process, as previously mentioned.

EXAMPLE 2

This is a hypothetical example of apparatus for removing particulate matter and gaseous pollutants simultaneously from a gas stream on a Copper Smelter. Reference is hereby made to FIG. 1:

A gas stream, arrow A, flow rate of 50,000 ACFM at a temperature of 800 degrees F. has a particulate grain loading of 15.0 gr./DSCF and a gaseous pollutant of $SO_2$ with a grain loading of 2.0 gr./DSCF, (374 pounds/hour), the primary pollutants in this gas stream. Other pollutants are associated with the gas stream, but are a minor importance in the overall clean up of the gas stream. A modeling program is specifically designed for sizing of the pollution removal apparatus calculates the material flow and sorbents to be used and determines the sorbents to be used for the cleaning of the gas stream will be hydrated Lime $Ca(OH)_2$ and ammonia $NH_3$. The rate of feed for the electrostatically charged hydrated lime and ammonia will be 534 and 54 pounds per hour respectfully, from the hopper feed system utilizing a two charged dry sorbent electrostatic guns 12 and 12a of the invention.

Three hundred fifty pounds per hour of hydrated lime, fined grained, −200 mesh, is feed from the sorbent system 11 to the charged dry sorbent electrostatic gun 12 wherein an electrostatic charge of 102,000 volts is applied to the fine grained hydrated lime particles from the high voltage power supply 67. 184 pounds per hour of hydrated lime, fine grained, −200 mesh, is feed from a second sorbent hopper system together with 54 pounds per hour of ammonia gas to the charged dry sorbent injection gun 12a wherein an electrostatic charge of 98,000 volts is applied to the fine grained hydrated lime particles and ammonia ga from the high voltage power supply 67. The voltage charge on the hydrated lime and the ammonia, is determined upon the results of a screen analysis on the particulate matter pollutants that must be removed from the particular gas stream, the distance the electrostatic gun is located from the first moving media filter bed and the amount and type of sorbents used. The charge will be a variable charge, depending on site specific information that is part of the modeling program. The hydrated lime and ammonia after being electrostatically charged are fed into the charged dry sorbent injection module 69, which feeds the electrostatically charged hydrated lime and ammonia into the polluted gas stream. The charged sorbents rapidly disperse into the gas stream, providing a large charged surface area for inducing the electrostatic charge onto the particulate matter entrained within the incoming gas stream and to supply a large area for the chemical reaction between the sorbents and the gaseous pollutants to react in. From the injection module 69 to the apparatus transition section, a chemical reaction between the hydrated lime and ammonia and the $SO_2$ takes place, creating $CaSO_3$, calcium sulfite $+H_2O$ and $(NH_4)_2SO_3$, ammonium sulfite and the charged hydrated lime sorbent also agglomerates the particulate material, more specifically the PM-10 particles this area is more specifically called the residence area or zone, which may or may not contain a specially constructed residence chamber.

The transition section has a much greater area than the gas stream line, causing a rapid decrease in the gas flow velocity. This change in velocity causes some of the heavier particulate particles and sorbent reacted gaseous pollutants in the gas stream to precipitate out of that flow falling in front of a plurality of vertical moving filter beds. The vertical moving filter beds, in this case are charged with two types of media material, sized to −⅜ inch to +6 mesh. The first moving filter bed is charged with silica gravel, a product used in the smelting process. The remaining second and third moving filter beds and the static filter bed are charged with slag, a byproduct of copper smelting, which will be of a minimum of cost. The media from the first moving filter bed will be fed directly into the smelting process, since silica is a flux material used in the smelting of copper concentrates, for this particular application. This direct feeding from the first moving filter bed into the smelting process will save on the screening costs of the material, presenting a cost savings, and will help in the recovery of volatilized copper, gold and other base metals, that are collected in this process, that are typically lost or not collected in conventional pollution control systems or devices. Any pollutants that have no economic value will be consumed in the smelting process or entrained in the slag from the smelting process and disposed of when the slag is drawn off and transported to the smelters slag disposal area, thus reducing handling problems associated with the disposal of collected fines and sorbent reacted material as in other processes.

The second and third moving filter beds and the static filter bed media material will be set up to recycle the slag, screening any collected particulate and sorbent reacted gaseous pollutants from the slag media, and recycling the screened media material, back into the second and third moving filter beds and the static filter bed. The particulates and pollutants screened from the media material, will be sent directly into the smelting process to further recover any volatilized copper, gold, silver and other base metals and to dispose of any particulates and collected pollutants of non economic value into the clients slag from the smelting process, as previously mentioned.

While a preferred embodiment of our invention in a hopper system and electrostatic gun for use in an apparatus for removing particulate matter and gases from a polluted gas stream have been shown and described herein, it should be understood that the present disclosure is made by way of example only and that variations and changes thereto are possible without departing from the subject matter coming within the scope of the following claims, and a reasonable equivalency thereof, which claims we regard as our invention.

We claim:

1. A hopper system and electrostatic gun for injection of an electrostatic charge sorbent into a polluted gas stream as part of an apparatus for removing particulate matter and gaseous pollutants comprising, a hopper system including a bin that has inner connected upstanding side walls that can be opened for receiving and maintaining a volume of a dry sorbent material; means for providing a flow of a measured volume of dry sorbent materials through a conduit means for mixing with a flow of air under pressure; a blower means connected to said conduct means to pass a controlled air flow into said conduit means for mixing with said volume of dry sorbent materials and conveying said mix through a sorbent feed line connected into an electrostatic gun; an electrostatic gun including a housing containing a straight barrel having a smooth inner bore including a fitting means for connecting to said sorbent feed line to receive said flow of dry sorbent, which said barrel bore opens therethrough for providing passage to said flow of dry sorbent and connects, at an open forward end, to a tube for receiving the electrostatically charged sorbent particles and injecting them into a polluted gas stream; a charging wand, formed from a straight section of an electrically conductive material maintained longitudinally in the center of said barrel, and connects, at a rear end of said charging wand, to an insulator means; an insulator means with means for connection to said charging wand and to a variable source of electrical power to transmit electrical power through said insulator means to said charging wand so as to produce a corona discharge surrounding said charging want to electrostatically charge individual particles of sorbent material that pass thereby and are dispersed into said polluted gas stream; and means for adjusting the electrical power supplied to said charging wand to provide a maximum electrostatic charge to approximately all said particles of sorbent materials as are passed through said straight barrel.

2. Apparatus as recited in claim 1, wherein the insulator means is contained within a cylindrical container mounted, at a forward ed, to the housing containing the straight barrel, said cylindrical container can be opened across a rear end for providing access to the insulator means mounted therein; and the insulator means is a conventional ceramic insulator containing a conducting rod maintained longitudinally therein that connects, on a rear end, to the power supply and connects to the charging wand on a forward end.

3. Apparatus as recited in claim 2, wherein the charging wand rear end connects, by a coupling collar, to the insulator means to receive a variable electrical energy supply therethrough, with said coupling collar arranged to receive, into open forward and rear ends, the charging wand rear end and the forward end of the conducting rod, respectively.

4. Apparatus as recited in claim 3, wherein a variable electrical power supply and control panel connected are electrically connected to the conducting rod to control the flow of electrical power thereto.

5. Apparatus as recited in claim 4, wherein the source of electrical power is variable and can provide either a negative or positive electrostatic charge.

6. Apparatus as recited in claim 1, wherein the hopper system bin receives a flow of gravity fed sorbent materials and provides a means for passing a sorbent materials flow gravity fed from said bin; and means for providing a controlled flow of sorbent materials for passage to the conduit for mixing with a controlled volume of air from the blower in a throat section of a venturi line.

7. Apparatus as recited in claim 6, wherein the means for providing a controlled flow of sorbent materials is a screw fed turned to move a volume of the dry sorbent materials into the conduit means; and the blower means is a regenerative blower providing a controlled volume of air, under pressure, into so as to entrain the sorbent material particulates during mixing in the throat section.

8. Apparatus as recited in claim 1, wherein the housing containing the straight barrel is a cylinder, mounting said straight barrel longitudinally therein, and said straight barrel includes a port connecting to the sorbent feed line to receive the air entrained sorbent material.

9. Apparatus as recited in claim 1, wherein a plurality of individual electrostatic guns and associated hopper systems are arranged to provide a controlled flow of electrostatically charged sorbent particles for injection into the polluted gas stream.

10. Apparatus as recited in claim 1, wherein the sorbent material is selected for reacting with the pollution constituents as are present in a particular polluted gas stream.

11. Apparatus as recited in claim 10, wherein the sorbent material is a hydrated lime having a particulate size of from at 15M (micron) to 1 mm (millimeter).

* * * * *